US009421729B2

(12) United States Patent
Fawcett et al.

(10) Patent No.: US 9,421,729 B2
(45) Date of Patent: Aug. 23, 2016

(54) ALIGNMENT OF DIES

(75) Inventors: Alan John Fawcett, Brookvale (AU); Angela Mary O'Dea, Brookvale (AU)

(73) Assignee: Watermarx Technology Pty Limited (AU)

( * ) Notice: Subject to any disclaimer, the term of this patent is extended or adjusted under 35 U.S.C. 154(b) by 1123 days.

(21) Appl. No.: 13/375,292

(22) PCT Filed: May 11, 2010

(86) PCT No.: PCT/AU2010/000540

§ 371 (c)(1), (2), (4) Date: Nov. 30, 2011

(87) PCT Pub. No.: WO2010/138990

PCT Pub. Date: Dec. 9, 2010

(65) Prior Publication Data

US 2012/0082830 A1 Apr. 5, 2012

(30) Foreign Application Priority Data

Jun. 2, 2009 (AU) ................................ 2009902486
Nov. 5, 2009 (AU) ................................ 2009905392

(51) Int. Cl.
*B32B 3/00* (2006.01)
*B29C 33/32* (2006.01)
*B31F 1/07* (2006.01)

(52) U.S. Cl.
CPC ........... *B31F 1/07* (2013.01); *B31F 2201/0712* (2013.01); *B31F 2201/0746* (2013.01); *B31F 2201/0753* (2013.01); *Y10T 29/49826* (2015.01); *Y10T 29/49885* (2015.01); *Y10T 29/53083* (2015.01); *Y10T 428/24802* (2015.01); *Y10T 428/24934* (2015.01)

(58) Field of Classification Search
CPC ...... B31F 1/00; B31F 2201/0712; B31F 1/07; B31F 2201/0746; B31F 2201/0753; Y10T 428/24802; Y10T 428/24934; Y10T 29/49826; Y10T 29/53083; Y10T 29/49885
See application file for complete search history.

(56) References Cited

U.S. PATENT DOCUMENTS

| | | | |
|---|---|---|---|
| 4,116,594 | A | 9/1978 | Leanna et al. |
| 6,152,035 | A | 11/2000 | Scholtz et al. |
| 7,717,035 | B1 | 5/2010 | Gray |
| 2002/0043161 | A1 | 4/2002 | Hutchison |

FOREIGN PATENT DOCUMENTS

| | | | |
|---|---|---|---|
| DE | 3104365 | A1 | 12/1982 |
| JP | 07148698 | A | 6/1995 |

OTHER PUBLICATIONS

International Search Report prepared by the Australian Patent Office, mailed on Jun. 21, 2010, for Application No. PCT/AU2010/000540.

*Primary Examiner* — John C Hong
(74) *Attorney, Agent, or Firm* — Design IP

(57) ABSTRACT

A set of dies for embossing or debossing is disclosed. The set has a female die (4, 80) and a male die (7, 67) each which has a steel backing plate (5, 47, 75). One of the dies is strongly magnetically attracted to a base plate (1, 68) which results in a weak magnetic attraction between the two dies (4, 7 or 67, 80). The weak magnetic attraction enables the set of dies to be substantially automatically self-aligning. Furthermore, such a set of dies can be used with a cutting and creasing die (50) to permit embossing or debossing simultaneously with cutting and/or folding during the same run.

10 Claims, 3 Drawing Sheets

ALIGNMENT OF DIES

CROSS REFERENCE TO RELATED APPLICATION

The present application is a U.S. National Stage Application of PCT application Serial No. PCT/AU2010/000540, filed on 11 May 2010, which claims priority from Australian Patent Application Serial No. AU 2009902368, filed on 25 May 2009, and AU 2009905392, filed on 5 Nov. 2009, all of which are incorporated by reference in their entireties.

FIELD OF THE INVENTION

The present invention relates to embellishing processes including embossing and debossing. In particular, the invention relates to aligning dies used in such processes.

BACKGROUND ART

Debossing creates a depression in stock (such as sheets or paper) and the equivalent process in embossing creates an upstanding portion which is therefore in relief. Debossing is therefore a mirror image of embossing. With an embossing die, which is a female die, there is an equivalent male die termed a counter. The planar stock is passed between the two dies which are then subjected to pressure and thereby creates the raised image.

One type of female die used in these processes is a photopolymer die. Typically the photopolymers used have a high Shore hardness. The photopolymers are processed by means of photoresist. The non image area is washed away with water by soft nylon brushes. The photopolymer is adhered to a thin metal backing plate which is preferably steel. The photopolymer die is secured to a platen base by means of adhesive tape and recently by means of magnetic attraction between the backing plate and magnets positioned in the platen or cylinder bed.

Counters can be made in accordance with at least three known prior art methods. The first is that the counters are cut by hand from paper using the PRAGOPLAST (Registered Trade Mark) system which involves feathered paper with an adhesive backing. The second is the use of moulded counters which are fabricated from fiberglass, putty, and various other plastics which are moulded under both heat and/or pressure to form the male counter. The third type of counter is fabricated from photopolymer and has a film backing which is also of polymeric or other plastic material. The film backing normally is transparent or translucent and thus aids in the alignment of the two dies since the operator can visualize the intended mating.

It is necessary to align or position the counter on the platen of the stamping machine, or cylinder in the case of a rotary machine. For the first type of counters, the counter is hand cut in position after being secured to the platen or cylinder. For both moulded counters and film backed photopolymer counters, the counter is positioned by means of a "reverse" fit. That is to say, the male counter is positioned by hand over the female die until the male protrusions of the counter appear to mate with the recesses of the female die. Once a snug fit has been achieved, double sided adhesive tape is placed on the back of the counter (that is the surface of the counter away from the female die). Then the platen or cylinder is brought into contact with the adhesive tape in order to fasten the counter (or male die) to the platen or cylinder.

However, there is a danger that the counter can move out of its correct position or alignment in the process of fastening the counter to the platen or cylinder. There is also a risk that the male counter can be damaged in the securing process.

Die cutting involves the use of a die to cut and/or crease stock (such as paper sheets or thin sheets of plastic) so as to fabricate a blank for an article such as an envelope, a folder, or the like. The die normally has a base of inexpensive material such as timber, five ply, particle board, or the like. Mounted on the base, edge upper most, are thin strips of steel. In the case of a desired cut, the upper edge is sharp and constitutes a knife. In the case of a desired crease, the upper edge of the strip is rounded. Extending along either side of at least the knife strips is a strip of resilient material which in its uncompressed state has a surface higher than the upper edge of the knife. The two strips of resilient material function as an ejector mechanism to prevent the cut stock becoming jammed on the knife.

In general cutting stock to shape using die cutting is a separate function to that of embossing or debossing of the stock. Thus if a job calls for cutting, and embossing or debossing 1000 items, in general this requires 2×1000 or 2000 operations as the item must be separately embossed or debossed, and then die cut.

However, in recent times it has been known to combine both cutting and either embossing or debossing. This has been possible using an expensive magnesium (or other metal) die to carry out the embossing/debossing. Such metal dies require environmentally burdensome acids to etch away the die material or must be hand engraved or CNC machined. The embossing/debossing die is generally held on the cutting die by means of double sided adhesive tape or screwed or bolted into the cutting tool and must be painstakingly aligned with the cutting die and with any counter required.

GENESIS OF THE INVENTION

The genesis of the present invention is a desire to provide an alternative arrangement in which the above-mentioned disadvantages are at least ameliorated to some extent.

SUMMARY OF THE INVENTION

In accordance with a first aspect of the present invention there is disclosed a set of dies for use in embossing or debossing and comprising a male die and a mating female die, wherein each of said dies has a magnetic or magnetically permeable backing.

In accordance with a second aspect of the present invention there is disclosed a method of mutually aligning a male and a female die which are complementary, said method comprising the steps of:

(i) fabricating each die with at least a magnetic or magnetically permeable backing, and (ii) in either order or substantially simultaneously, approximately aligning said dies and applying an attractive magnetic force between said dies;

whereby said magnetic force mates the male and female portions of said approximately aligned dies to accurately align same.

According to another aspect of the present invention there is provided a planar substrate of paper, cardboard or like printing stock embossed or debossed with dies aligned in accordance with the above-mentioned method or embossed or debossed with the above-mentioned set of dies.

The female die can take the form of a steel backed metal block (the metal being non-ferrous such as brass, copper, magnesium, zinc or aluminum) or a steel backed photopolymer block or any substrate that can laminated with a steel backing, all of which can enjoy the benefits of the abovementioned magnetic mounting and alignment.

Similarly the male die can be a steel block or a steel backed block fabricated from a material such as fiberglass, plastic, epoxy resin, photopolymer, non-ferrous metals or any substrate that can laminated with a steel backing and thus enjoy the benefits of the magnetic mounting and alignment

BRIEF DESCRIPTION OF THE DRAWINGS

A preferred embodiment of the invention will now be described, by way of example only, with reference to the accompanying drawings in which.

DETAILED DESCRIPTION

Figure 1:
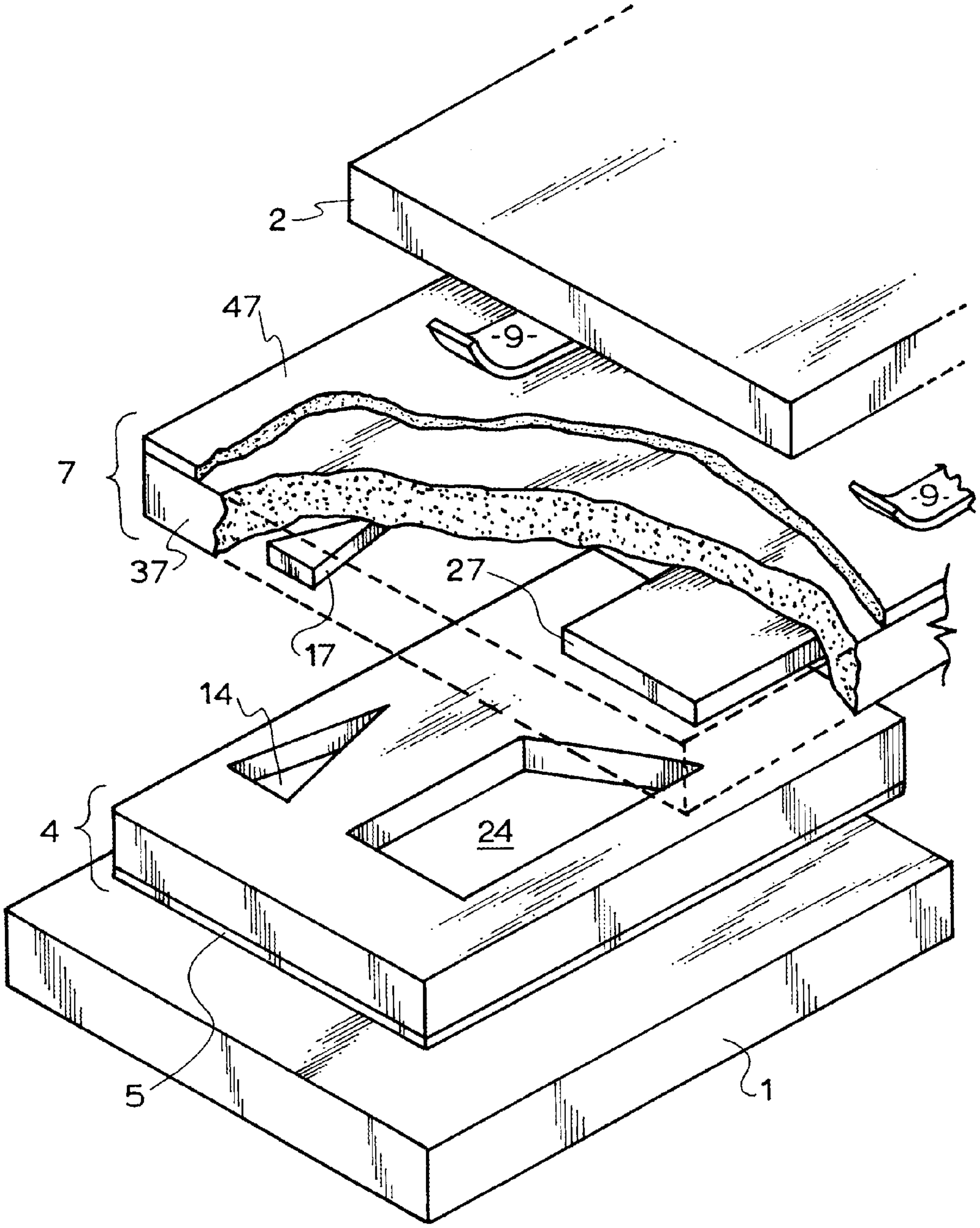
FIG. 1 is an exploded perspective view of a set of embossing dies of a first embodiment.

As seen in FIG. 1, a printing machine such as a foil stamping machine or a die cutting machine is provided with bed (conventional and not illustrated in FIG. 1) and to the upper surface of which a base plate 1 is secured. The machine also has a conventional platen or cylinder drum 2. Positioned above the base plate 1 is a female photopolymer die 4 having a backing plate 5. Positioned above the female die 4 is a complementary male die 7 also fabricated from photopolymer and having a complementary male shape. In this connection it will be apparent that the female die 4 has two recesses 14 and 24 which are respectively triangular and quadrilateral in shape. The male die 7 has two protrusions or bosses 17 and 27 which are also respectively triangular and quadrilateral in shape. The male die 7 and the female die 4 are complementary in the sense that the bosses 17 and 27 mate with the recesses 14 and 24.

In use the paper substrate, for example, is passed between the two dies 4 and 7. The mating of the bosses 17, 27 with the recesses 14, 24 results in the substrate being embossed or debossed with the shape of the recesses 14, 24.

As seen in FIG. 1, the male die 7 is provided with a photopolymer body 37 and a thin sheet steel backing plate 47. The bosses 17, 27 project downwardly from the lower surface of the photopolymer body 37. The upper surface of the backing plate 47 is provided with an array of adhesive strips 9 (the adhesive strips can be placed on the platen or cylinder 2, or the backing plate 47 as illustrated, or both) which are provided with adhesive on both sides and thus are used to interconnect the male die 7 and the platen 2.

However, before this interconnection takes place, the male die 7 must be correctly aligned with the female die 4.

In accordance with the invention disclosed in International Patent Application No. WO2007/045037 (PCT/AU2007/001553), the contents of which are hereby incorporated herein for all purposes, the base plate 1 is provided with an embedded array of magnets (not illustrated in FIG. 1). These magnets magnetically clamp the base plate 1 to the bed of the machine. The same magnets also secure the backing plate 5 of the female die 4 to the base plate 1 with a strong magnetic attraction. This strong magnetic attraction is sufficient to easily withstand vibration forces and other forces applied to the female die 4 during the processing.

However, fabricating the male die 7 so as to have a magnetically permeable backing plate 47 means that there is also a relatively weak magnetic attraction between the backing plate 47 and the magnets of the baseplate 1. This force is weak relative to the strong magnetic forces between the bed and baseplate 1 and between the baseplate 1 and backing plate 5, because the backing plate 47 is always spaced from the baseplate 1 by a substantial distance and because most of the magnetic flux generated by the baseplate magnets passes through the backing plate 5. This weak magnetic force is approximately of the same strength as the magnetic force between a fridge magnet and the metal of a fridge door.

A consequence of the weak magnetic attraction between the male die 7 and the base plate 1 is that the male die 7 can be approximately correctly aligned with the female die 4 by hand and the weak magnetic attraction will guide the bosses 17, 27 into the recesses 14, 24 because this draws the backing plate 47 closer to the magnets in the base plate 1. Consequently, the two dies 4, 7 when correctly aligned with the bosses 17, 27 mated with the recesses 14, 24 represent a lower energy state and thus are magnetically urged into that state. Thus the correct alignment is to some extent automatic.

In addition, some machines utilize an inverting bed which swings out and inverts the base upon which the dies reside. Thus normally in such a machine the male counter is located beneath the female die when the bed is swung outwardly. For such machines, the above described arrangement assists the operator in holding the dies securely before final fastening.

Once the correct alignment has been achieved, the adhesive strips 9 can be placed on the backing plate 47 and the platen 2 brought into contact with the adhesive strips 9. Since the adhesion between the adhesive strips 9 and the platen or cylinder 2 is greater than the weak magnetic attraction between the backing plate 47 and the magnets in the base plate 1, this means that the platen 2 with the adhered male die 7 can be raised out of contact with the female die 4 but the correct alignment between the two dies 4, 7 is maintained.

Figure 2:
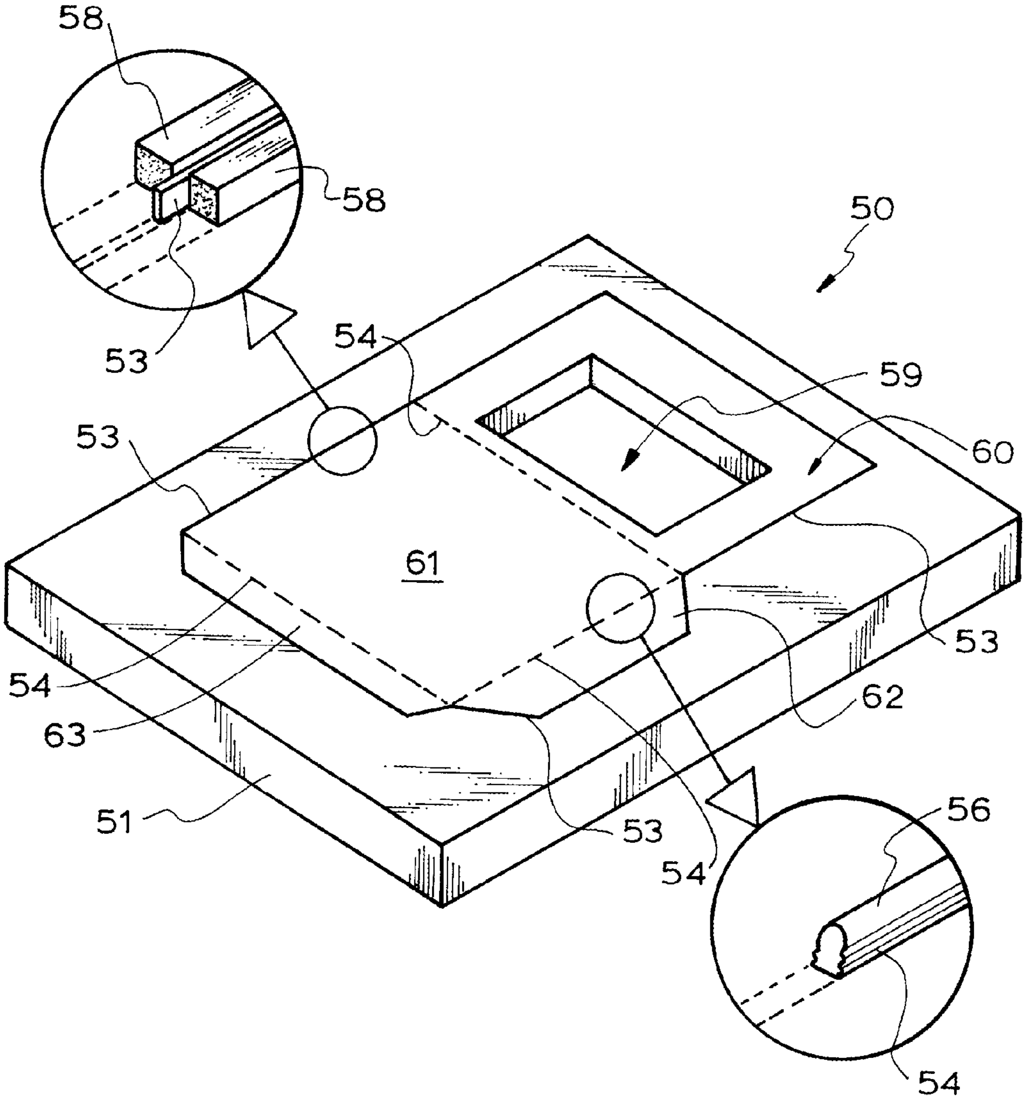
FIG. 2 is a perspective view of a cutting and creasing die adapted to receive an embossing die.

Turning now to FIG. 2, a substantially conventional cutting and creasing die 50 is illustrated having a base plate 51 fabricated from timber, 5 ply, particle board or some other such inexpensive material. Located on the base plate 51 are knives 53 and crease formers 54. As seen in the right hand enlargement of FIG. 2, the crease former 53 takes the form of a thin strip of metal embedded edgewise into a groove cut into the base plate 51 and having an upper edge 56 which is rounded.

As seen in the left hand enlargement in FIG. 2, each knife 53 take the form of a very thin strip of metal again embedded edgewise into a groove cut into the base plate 51. The upper edge of the knife 53 is sufficiently sharp to cut the stock, typically paper or cardboard. Extending along each side of the knife 53 is a corresponding ejector strip 58 which is slightly taller than the knife 53 and is fabricated from resilient material such as foamed plastics.

The cutting and creasing die 50 is conventionally used to cut and crease planar printing stock so as to create a blank, for example of an envelope. In the die 50 in FIG. 2 the envelope outline has a front surface 60, a rear surface 61 and two edge flaps 62 and 63. In conventional fashion, when the stock is compressed between the base plate 51 and an overhead platen or cylinder (not illustrated), the knives 53 cut out the outline of the envelope blank. The resilient ejector strips push the cut stock away from the knives 53 and so prevent the cut or slit stock becoming jammed on the knife 53. The stock is also bent over each crease former 54 and so creased to thereby form the location for corresponding folds in the cut stock.

Figure 3:
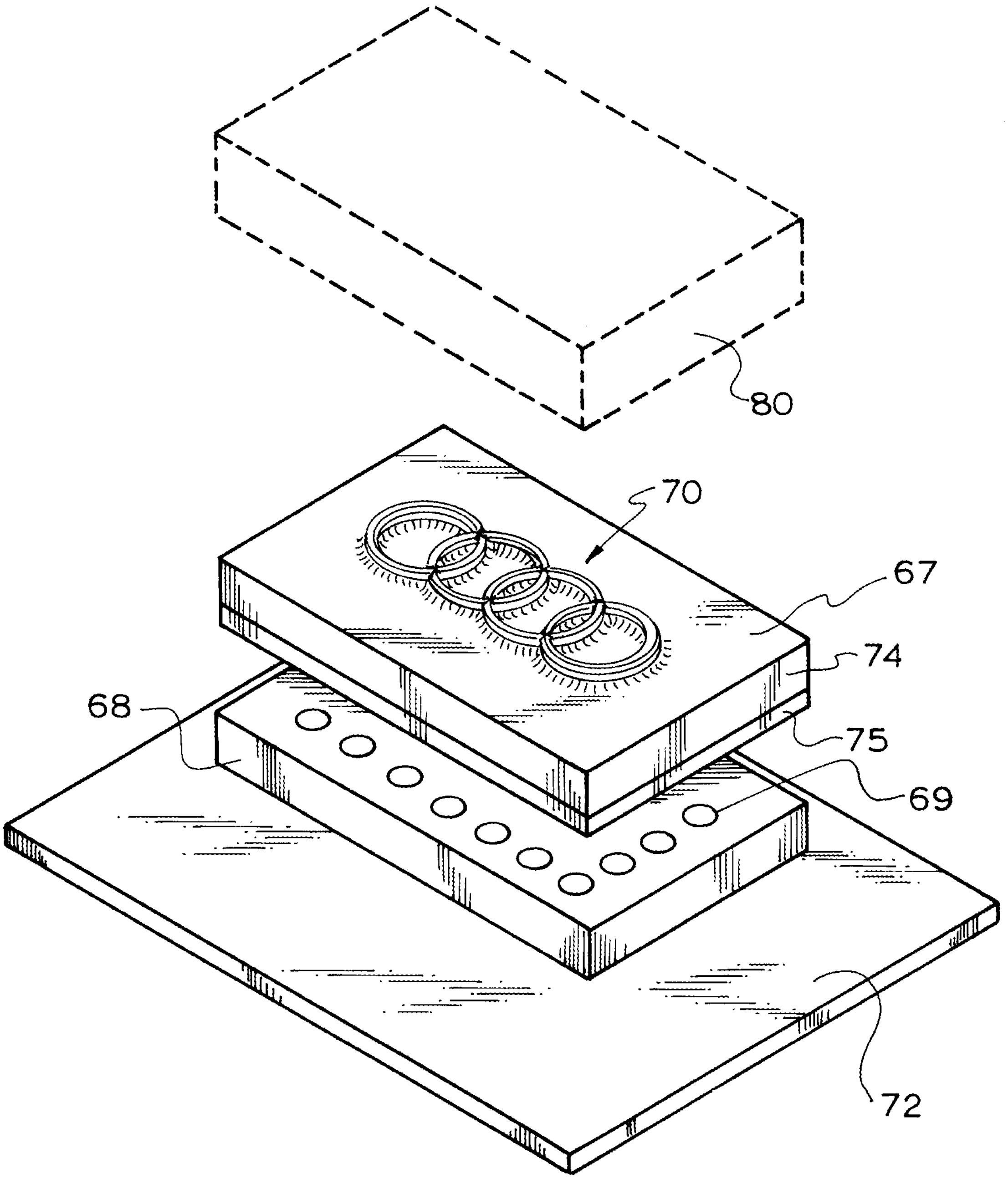
FIG. 3 is a perspective view of the male embossing die to be received by the die of FIG. 2.

The above description of the cutting and creasing die 50 is thus far conventional. The die 50 is modified in accordance with the second embodiment of the present invention by the cutting away, or routing, of the base plate 51 to form a cavity 59 which is preferably of a standard dimensional size eg. A6, A7, A8, etc. Located within the cavity 59 is a male embossing die 67, a magnetic base plate 68 and a thin steel plate 72 as illustrated (to an enlarged vertical scale) in FIG. 3. The male embossing die 67 could be fabricated by etching a metal block such as a magnesium, brass, copper, zinc or steel block but this requires environmentally difficult acids. Where a metal other than steel is used the die 67 preferably includes a thin steel backing plate. Alternatively, the die 67 could be hand engraved or CNC machined. Instead the embossing die 67 is preferably formed from a photopolymer layer 74 and a steel backing plate 75. Preferably the upper surface of the photopolymer layer 74 is shaped using photo resist techniques (which are water based and thus environmentally benign) so as to form a logo 70 or image such as the four interlinked rings of the AUDI Registered Trade Mark.

A magnetic base plate 68 (with its array of magnets 69) is located on the thin steel plate 72 within the cavity 59. The thin steel plate 72 is preferably held in place by means of double sided adhesive tape (not illustrated in FIGS. 2 and 3 but illustrated as 9 in FIG. 1) or other such suitable strong adhesive. Thus, in this embodiment, the thin steel plate 72 always remains with the cutting tool die 50.

There is a counter 80 (illustrated in phantom in FIGS. 2 and 3) which has a reverse (ie female) image of the logo 70 and which can be magnetically guided into registration with the die 67 as described above in relation to FIG. 1. Once the counter 80 is in register with the die 67, the counter 80 can be adhered by means of double sided adhesive tape to the platen (or cylinder) which is to compress the stock against the cutting and creasing die 50.

As a result of the above describe arrangement, the stock is simultaneously compressed against the die 50 thus forming the shape of the desired blank, and also compressed between the counter 80 and the embossing die 67 thereby simultaneously embossing the logo 70 onto the front surface 60 of the envelope. Thus cutting the envelope and embossing same are achieved simultaneously by means of a single pass through the machine.

The magnetic base plate 68 can be removed from the cutting die 50 and used on other jobs. The magnetic base plate 68, either with the embossing die 67 or a different embossing die, can be held on the thin steel plate 72 on another occasion when embossing or debossing is required. It is convenient for the thin steel plate 72 to remain with the die 50 and for the magnetic plate 68 to be transferred from job to job.

The foregoing describes only two embodiments of the present invention and modifications, obvious to those skilled in the printing arts, can be made thereto without departing from the scope of the present invention.

For example, the backing plate 47 can be fabricated from material which is magnetic, or magnetized, so as to create the desired weak magnetic attraction between the male die 7 and the platen 2. Other magnetic and magnetically permeable arrangements, which contain ferric material, for example, will be apparent to those skilled in the magnetic arts.

Similarly, the die 67 can have a male representation of the logo 70, and the counter 80 can have the female representation of the logo 70, in which case the logo 70 is debossed onto the front 60 of the envelope rather than embossed.

Furthermore, some cutting tool dies have provision for multiple tools so that, say, eight envelopes are cut simultaneously. Under these circumstances such a die would have eight recesses 67 each with a thin steel plate 72 so that each of the eight envelopes can be simultaneously cut and embossed at the one time.

The term "comprising" (and its grammatical variations) as used herein is used in the inclusive sense of "including" or "having" and not in the exclusive sense of "consisting only of".

The invention claimed is:

1. A method comprising:

(a) securing a first die to a base plate using a first attractive magnetic force between the first die and the base plate, at least a portion of the first die comprising a magnetically permeable material and at least a portion of the base plate comprising a magnetic material;

(b) placing a second die atop the first die, at least a portion of the second die comprising a magnetically permeable material, one of the first and second dies comprising a female die and the other of the first and second dies comprising a male die that is complementary in shape to the female die;

(c) adjusting a position of the second die until a second attractive magnetic force between the second die and the base plate urges the male die into alignment with the female die;

(d) affixing the second die to a platen or cylinder; and (e) performing at least one of a stamping, embossing, debossing, cutting or creasing step after performing steps (a) through (d).

2. The method of claim 1 wherein step (d) comprises affixing the second die to the platen or cylinder using double sided adhesive tape.

3. The method of claim 1 wherein step (e) comprises performing the at least one of a stamping, embossing, debossing, cutting or creasing step using a baseplate comprising a cutting and creasing die.

4. The method of claim 3 wherein step (e) comprises performing the at least one of a stamping, embossing, debossing, cutting or creasing step using a baseplate comprising a cutting and creasing die having a recessed cavity which receives said base plate.

5. The method of claim 1 wherein step (a) comprises securing the first die to the base plate using magnetic attraction between the first die and the base plate, the base plate having at least one permanent magnet embedded therein.

6. The method of claim 1 wherein step (b) comprises placing the second die atop the first die, at least one of the first die and the second die having a body fabricated from an etchable, engravable or machinable non-ferrous metal including brass, copper, magnesium, zinc and aluminium and which is attached to the magnetically permeable material.

7. The method of claim 6, further comprising:

(f) providing the second die with a metal backing plate that is thinner than, and attached to, the body of the second die.

8. The method of claim 1 wherein step (b) comprises placing the second die atop the first die, at least one of the first dies and the second dies having a body fabricated from a material selected from the class consisting of photopolymer, fibreglass, plastic, and epoxy resin and which is attached to the magnetically permeable material.

9. The method of claim 8, further comprising:

(f) providing the second die with a metal backing plate that is thinner than, and attached to, the body of the second die.

10. The method of claim 1 wherein step (c) adjusting a position of the second die until a second attractive magnetic force between the second die and the base plate urges the male die into alignment with the female die, the second magnetic force being weaker than the first magnetic force.

* * * * *